April 24, 1956

L. A. LAYNE ET AL 2,743,087

UNDER-REAMING TOOL

Filed Oct. 13, 1952

Leslie A. Layne
Louis C. Mundt
INVENTOR.

BY

ATTORNEY

April 24, 1956 L. A. LAYNE ET AL 2,743,087
UNDER-REAMING TOOL
Filed Oct. 13, 1952 3 Sheets-Sheet 2
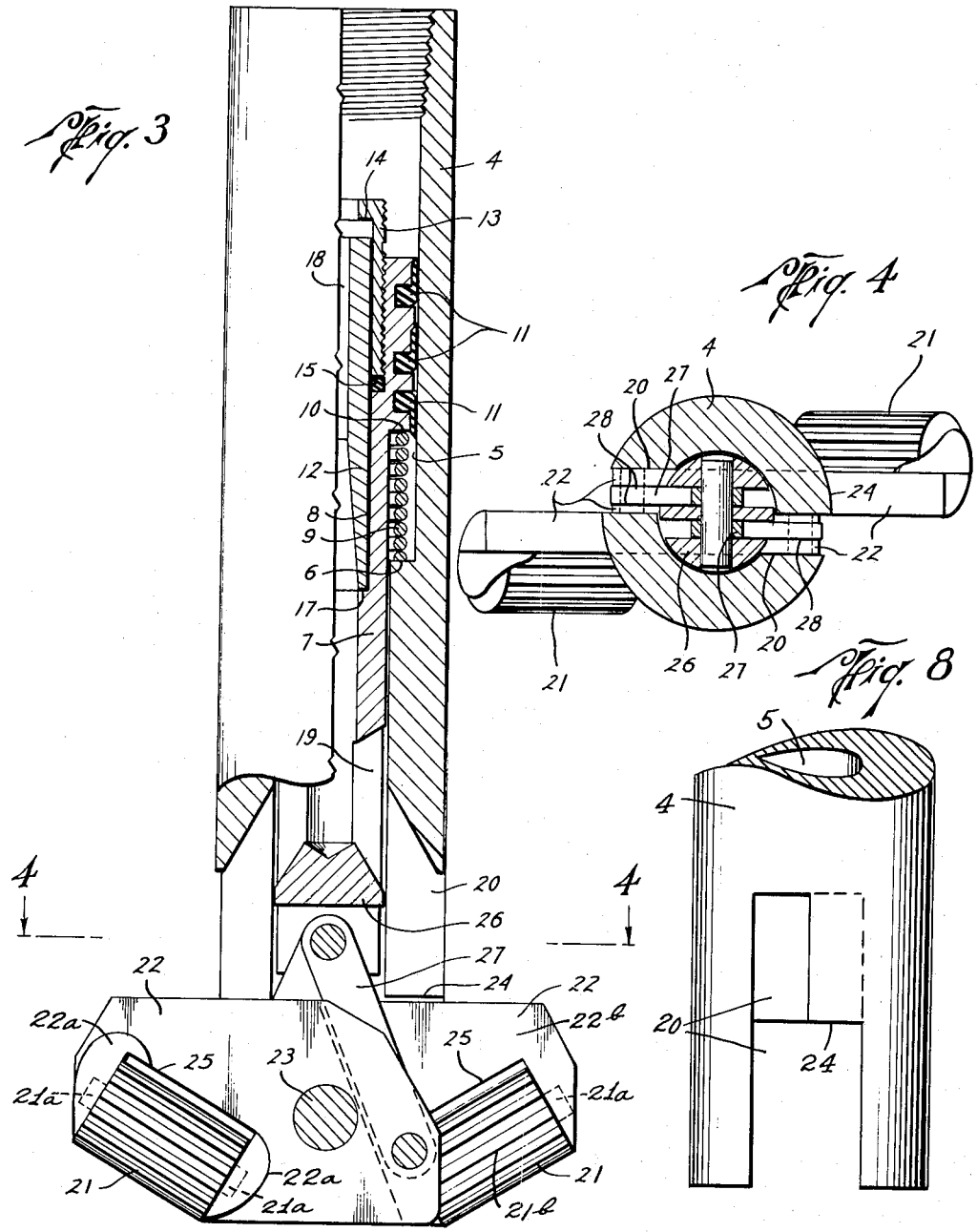
Leslie A. Layne
Louis C. Mundt
INVENTOR.
BY
ATTORNEY

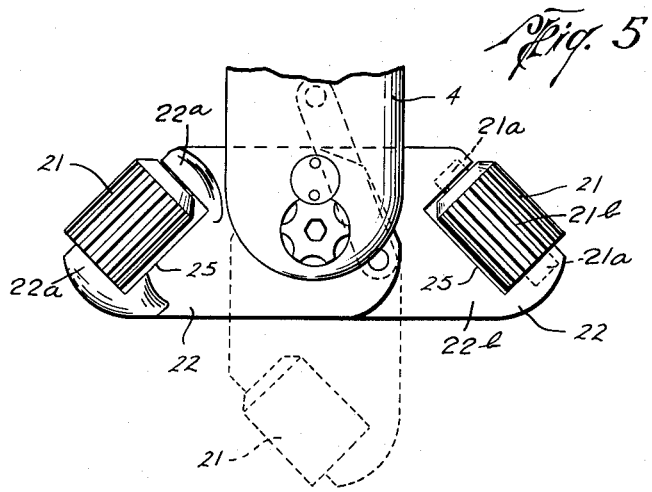
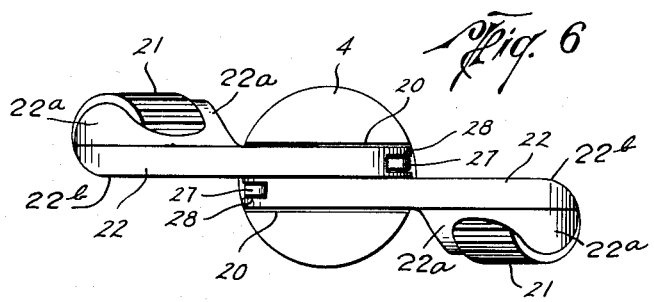
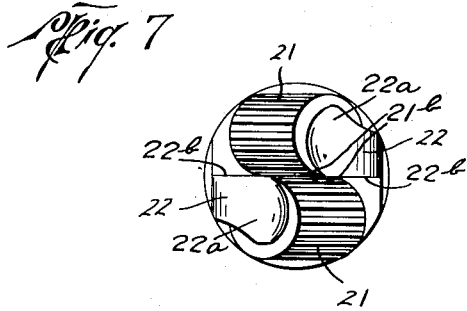
Leslie A. Layne
Louis C. Mundt
INVENTORS
ATTORNEY

2,743,087

UNDER-REAMING TOOL

Leslie A. Layne and Louis C. Mundt, Houston, Tex.; said Mundt assignor to said Layne Application October 13, 1952, Serial No. 314,550

7 Claims. (Cl. 255—76)

The invention concerns an under-reaming tool for use in enlarging well bores.

The invention contemplates a collapsible under-reaming tool which, in its collapsed position, may be lowered into a small diameter hole, and which may be expanded to a relatively large diameter after it is inserted in the hole.

The invention further contemplates an under-reaming tool which permits the circulation of a drilling fluid in and out of the hole simultaneously with the cutting operation, and in which the pressure of the drilling fluid is utilized to expand the cutting elements of the tool.

It is an object of the invention to provide an under-reaming tool of the type described having a pair of cutting elements comprising toothed cutting rollers, whereby the tool is particularly adapted for use in drilling hard formations.

Another object of the invention is to provide an under-reaming tool of the type described having a pair of cutting elements comprising toothed cutting rollers which, in their operative position, are disposed at an acute angle with respect to the longitudinal axis of the tool. The arrangement is such that the cutting elements continuously form a tapered hole as the cutting proceeds, by enlargement of the existing bore. The existing bore acts as a pilot hole for the under-reaming tool, thus insuring the formation of a straight hole during the under-reaming operation.

The invention will be readily understood by referring to the following description and the accompanying drawing, in which:

Fig. 3 is a sectional view in elevation showing the cutting elements in expanded position.

Fig. 4 is a sectional plan view taken on the line 4—4 of Fig. 3.

Fig. 5 is a fragmentary side view of a modified form of the invention, showing the cutting elements in expanded position.

Fig. 6 is a bottom view of the embodiment of the invention shown in Fig. 5, showing the cutting elements in expanded position.

Fig. 7 is a bottom view of the embodiment of the invention shown in Fig. 5, showing the cutting elements in closed position.

Fig. 8 is a fragmentary side view showing the lower portion of the body of the tool, as seen from the right in Fig. 4.

Figure 1:
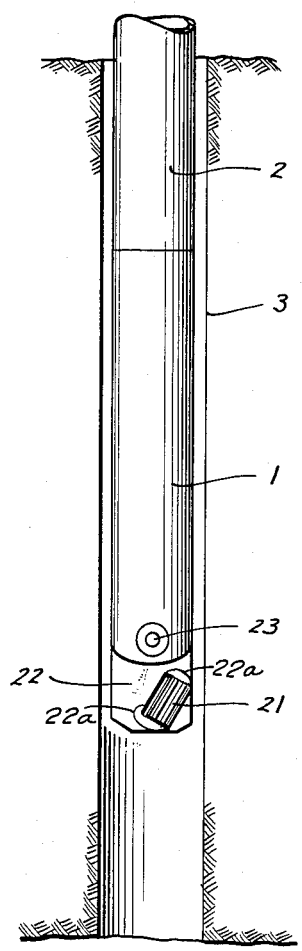
Fig. 1 is a diagrammatic view in elevation showing an under-reaming tool embodying the invention disposed in a well bore, the cutting elements being in closed position.
Figure 2:
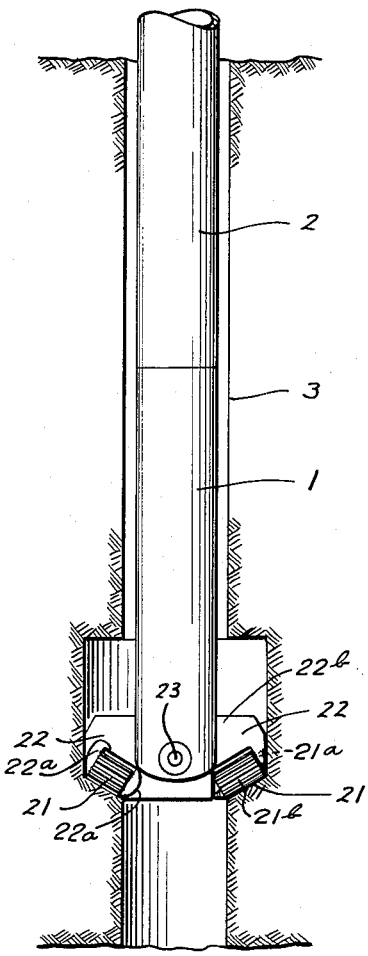
Fig. 2 is a diagrammatic view in elevation, similar to Fig. 1, showing the cutting elements in expanded position.

Referring to Figs. 1 and 2 of the drawing, an under-reaming tool embodying the invention, which is indicated generally by the numeral 1, is attached to the lower end of a string of pipe, designated by the numeral 2, the entire assembly being disposed within a well bore 3. Fig. 1 shows the tool in its collapsed position, before the under-reaming operation is started, while Fig. 2 shows the tool in its operative position, with the cutting elements expanded.

Referring to Figs. 3 and 4 of the drawing, an elongated, vertically disposed body member 4 is threaded at its upper end whereby it may be connected to the lower end of a string of pipe and rotated therewith. The exterior surface of the body member 4 is cylindrical, and a cylindrical bore 5 is formed therein. The upper end of the bore 5 is of larger diameter than its lower end whereby an internal shoulder 6 is formed intermediate the ends of the bore 5.

A plunger 7 is disposed within the bore 5. The exterior surface of the plunger 7 is cylindrical, and a cylindrical bore 8 is formed in the upper portion thereof. A compression spring 9 is disposed within the bore 5 and surrounds the upper portion of the plunger 7. The lower end of the spring 9 is seated upon the internal shoulder 6, and the upper end of the spring 9 bears against the under side of a shoulder 10 which extends outwardly from the upper end of the plunger 7. A plurality of cup washers 11 surround the upper end of the plunger 7 and slidably engage the bore 5. The arrangement is such that the plunger 7 is urged upwardly with respect to the body member 4 by the action of the spring 9.

The upper end of the bore 8 is open and in communication with the interior of the bore 5. The effective diameter of the bore 8 is reduced by a choke bean 12 which is inserted in the upper end of the bore 8. The choke bean 12 is secured in the bore 8 by a lock nut 13, which is inserted in an enlarged threaded portion of the bore 8 adjacent its upper end. The lock nut 13 has an internal shoulder 14 adjacent its upper end which loosely engages the upper end of the choke bean 12 to retain the choke bean 12 in the bore 8. The inner end of the lock nut 13 engages a resilient O ring 15 which is disposed within the bore 8 and is seated upon an internal shoulder 16. The lower end of the choke bean 12 bears against an internal shoulder 17. The choke bean 12 has a cylindrical bore 18, which is tapered downwardly and outwardly adjacent its lower end. The arrangement is such that the plunger 7 is forced downwardly with respect to the body member 4 by the action of fluid pressure applied thereto.

A pair of diametrically opposed longitudinal slots 19 are formed in the wall of the plunger 7 adjacent the lower end of the bore 8. The slots 19 are in communication with a pair of diametrically opposed longitudinal slots 20, which are formed in the wall of the body member 4 adjacent the lower end thereof, when the plunger 7 is in its lowermost position. The arrangement is such that upon applying fluid pressure to the upper end of the plunger 7, the action of the fluid first forces the plunger 7 downwardly with respect to the body member 4 until the slots 19 are in communication with the slots 20. Thereafter the fluid is discharged into the well bore on opposite sides of the tool, thru the slots 19 and 20, and serves to carry away the cuttings as formed.

A pair of cutting elements, as hereinafter described, are pivotally secured to the lower end of the body member 4. In their closed position the cutting elements extend downwardly below the lower end of the body member 4, and are disposed wholly within an area having a circumference corresponding to the circumference of the body member 4. The cutting elements are capable of being expanded, by the application of hydraulic pressure as hereinafter described, whereby they are swung upwardly and outwardly into operative position.

Each of the cutting elements comprises a toothed cutting roller 21 and a base plate 22. The base plates 22 are disposed vertically within the slots 20, in side by side relation to each other, and are pivotally connected intermediate their ends, by a pin 23, to the wall of the body member 4 adjacent its lower end. The slots 20 are widened adjacent their lower ends to receive the connected ends of the base plates 22. The portion of the wall of the body member 4 below the pin 23 is rounded to permit the cutting elements to swing freely about the pin 23. The upper edges of the widened portions of the slots 20 form abutments 24, which limit the upward movement of the base plates 22. The leading edges of the base plates 22, which may be the lower edges, as shown in Fig. 3, or the upper edges, as shown in Fig. 5, are cut away at 25 to receive the cutting rollers 21. The cutting rollers 21 are rotatably mounted on shafts 21a which are secured at their ends to built up portions 22a of the base plates 22. The shafts 21a of the cutting rollers 21 are positioned substantially on the sides of the base plates 22 opposite the adjacent sides thereof, and the built up portions 22a are positioned on the same sides of the base plates 22 as the shafts 21a and substantially surround the ends thereof. The adjacent sides of the cutting elements, which constitute the leading surfaces thereof during rotation of the tool, are disposed in the same vertical plane, and the leading edges 21b of the cutting rollers 21 are aligned with the leading sides 22b of the base plates 22. Thus the cutting rollers 21 as well as the base plates 22 are disposed in side by side relation to each other when the cutting elements are in closed position.

The lower end of the plunger 7 terminates in a trifurcated portion 26, the three prongs of which form between them a pair of clevises which are pivotally connected, respectively, to a pair of links 27. The opposite ends of the links 27 are pivotally connected, respectively, to the ends of the base plates 22 opposite the cutting rollers 19. The base plates 22 are wider than the links 27, and slots 28 are formed in the adjacent edges of the base plates 22 for engagement by the ends of the links 27.

The arrangement is such that the cutting elements, which are normally disposed wholly within an area having a circumference corresponding to the circumference of the body member 4, and which extend downwardly below the lower end of the body member 4, are caused to swing upwardly and outwardly in opposite directions when the plunger 7 is moved downwardly with respect to the body member 4.

The cutting rollers 21 are so positioned with respect to the base plates 22 that, when the cutting elements are expanded to operative position, the cutting rollers 21 are disposed at an acute angle with respect to the longitudinal axis of the body member 4.

In the embodiment of the invention shown in Figs. 1 to 4 the cutting rollers 21 are positioned adjacent the lower edges of the base plates 22. Thus the cutting action is effected as the tool is advanced downwardly in the well bore, and the cutting elements continuously form a downwardly and inwardly tapered hole as the cutting progresses.

Figs. 5 to 7 show a modified form of the invention in which the cutting rollers 21 are positioned adjacent the upper edges of the base plates 22, and the cutting action is effected as the tool is advanced upwardly in the well bore. In the modified arrangement the cutting elements continuously form an upwardly and inwardly tapered hole as the cutting progresses. This arrangement is particularly adapted for use in the initial stage of the under-reaming operation, as the position of the cutting rollers 21 is such that they engage the walls of the well bore 3 immediately upon the application of pressure to expand the cutting elements.

The invention may be modified in various ways without departing from the spirit and scope thereof.

We claim:

1. An under-reamer comprising a cylindrical body member having a pair of diametrically opposed longitudinal slots formed in the wall thereof adjacent its lower end, a pair of initially retracted cutting elements each comprising a base plate and a cutting roller carried by the base plate, the base plates being disposed vertically within the slots, in side by side relation to each other, and being pivotally connected to the wall of the body member adjacent its lower end and extending downwardly below the lower end of the body member, and means connected to the base plates for swinging them outwardly in opposite directions to horizontal positions in engagement with abutments formed by upper portions of the slots, each of the cutting rollers being rotatably mounted on a marginal portion of one of the base plates, below the body member when the cutting elements are disposed in retracted position, the adjacent edge of each of the base plates being cut away to receive the cutting roller and the cutting roller being journaled on a shaft disposed substantially on one side of the base plate and connected at its ends to built up portions of the base plate, the cutting rollers as well as the base plates being disposed in side by side relation to each other when the cutting elements are disposed in retracted position.

2. An arrangement as described in claim 1 in which each of the cutting rollers has a cutting edge inclined in a vertical plane when the cutting elements are disposed in expanded position.

3. An arrangement as described in claim 1 in which each of the cutting rollers has a lower cutting edge inclined in a vertical plane, in a downward and inward direction, when the cutting elements are disposed in expanded position.

4. An arrangement as described in claim 1 in which each of the cutting rollers has an upper cutting edge inclined in a vertical plane, in an upward and inward direction, when the cutting elements are disposed in expanded position.

5. An arrangement as described in claim 1 in which each of the cutting rollers has a cutting edge inclined in a vertical plane when the cutting elements are disposed in retracted position.

6. An arrangement as described in claim 1 in which each of the cutting rollers has a cutting edge inclined in a vertical plane, and facing downwardly and outwardly in the direction opposite that in which the base plate is swung, when the cutting elements are disposed in retracted position.

7. An arrangement as described in claim 1 in which each of the cutting rollers has a cutting edge inclined in a vertical plane, and facing downwardly and outwardly in the direction in which the base plate is swung, when the cutting elements are disposed in retracted position.

References Cited in the file of this patent

UNITED STATES PATENTS

| Number | Name | Date |
|---|---|---|
| 1,571,309 | Wall | Feb. 2, 1926 |
| 1,708,932 | Brown | Apr. 16, 1929 |
| 1,821,473 | Mercer | Sept. 1, 1931 |
| 1,834,337 | Crum | Dec. 1, 1931 |
| 1,857,616 | Baker | May 10, 1932 |
| 1,900,226 | Conant | Mar. 7, 1933 |
| 1,981,262 | Burt | Nov. 20, 1934 |
| 1,997,436 | Seay | Apr. 9, 1935 |
| 2,203,998 | O'Grady | June 11, 1940 |
| 2,548,931 | Baker | Apr. 17, 1951 |
| 2,599,060 | Kammerer | June 3, 1952 |
| 2,644,673 | Baker | July 7, 1953 |